United States Patent
Zhao et al.

(10) Patent No.: US 12,441,839 B2
(45) Date of Patent: Oct. 14, 2025

(54) METHOD FOR PRODUCING HIGH TEMPERATURE-RESISTANT POLYAMIDE, HIGH TEMPERATURE-RESISTANT POLYAMIDE AND USE THEREOF

(71) Applicants: Cathay Biotech Inc., Shanghai (CN); CIBT America Inc., Newark, DE (US); Shanxi Synthetic Biology Institute Co., Ltd., Taiyuan (CN)

(72) Inventors: Yuanbo Zhao, Shanghai (CN); Bingbing Qin, Shanghai (CN); Xiucai Liu, Shanghai (CN)

(73) Assignees: Cathay Biotech Inc., Shanghai (CN); CIBT America Inc., Newark, DE (US); Shanxi Synthetic Biology Institute Co., Ltd., Taiyuan (CN)

( * ) Notice: Subject to any disclaimer, the term of this patent is extended or adjusted under 35 U.S.C. 154(b) by 881 days.

(21) Appl. No.: 17/566,746

(22) Filed: Dec. 31, 2021

(65) Prior Publication Data
US 2022/0306804 A1  Sep. 29, 2022

(30) Foreign Application Priority Data
Nov. 2, 2020  (CN) .......................... 202011201176.5

(51) Int. Cl.
 *C08G 69/28* (2006.01)
(52) U.S. Cl.
 CPC .................................. *C08G 69/28* (2013.01)
(58) Field of Classification Search
 None
 See application file for complete search history.

(56) References Cited

FOREIGN PATENT DOCUMENTS

| | | |
|---|---|---|
| CN | 110028665 | 7/2019 |
| CN | 111269413 | 6/2020 |

OTHER PUBLICATIONS

English language machine translation of CN 110028665 (Year: 2019).*
English language machine translation of CN 111269413 (Year: 2020).*

* cited by examiner

*Primary Examiner* — Megan McCulley
(74) *Attorney, Agent, or Firm* — Robin L. Teskin; Baker, Donelson, Bearman, Caldwell & Berkowitz PC

(57) ABSTRACT

The present invention provides a process for producing a high temperature resistant polyamide, the high temperature resistant polyamide and the use thereof. The process comprises: optionally concentrating a polyamide salt solution, and then conducting the following operations: heating and pressurizing to a pressure of P1, and maintaining the pressure, wherein the temperature of the system is T1 at the end of the pressure-maintenance; depressurizing to a pressure of P2, wherein the temperature of the system is T2 at the end of the depressurization; and evacuating, whereby a polyamide melt is obtained; wherein P1 is 0.8-4 MPa, T1 is 250-290° C., T1<T2 and (T2−T1)/(P1−P2)=5-75. The process for producing a high temperature resistant polyamide according to the present invention is simple to operate and reduces energy consumption. The obtained high temperature resistant polyamide may be used as a raw material for such injection molded parts, molded articles, or fibers as high temperature resistant attachments for machines, automobiles, household appliances, toys, textiles, sporting goods, mobile phones, computers, laptops, GPS devices, or optical devices.

18 Claims, No Drawings

METHOD FOR PRODUCING HIGH TEMPERATURE-RESISTANT POLYAMIDE, HIGH TEMPERATURE-RESISTANT POLYAMIDE AND USE THEREOF

TECHNICAL FIELD

The invention relates to a process for producing a high temperature resistant polyamide, the high temperature resistant polyamide and the use thereof.

BACKGROUND ART

High temperature resistant polyamides generally refer to polyamide engineering plastics that can be used at, or above 150° C. for a long time. High temperature resistant polyamides have good wear resistance, heat resistance, oil resistance and chemical resistance. They also greatly reduce water absorption and shrinkage of raw materials, and have excellent dimensional stability and excellent mechanical strength. As compared with aliphatic polyamides, semi-aromatic polyamides generally have excellent heat resistance. High temperature resistant polyamides are increasingly used in the fields in which high heat resistance is desired, such as automobile, construction, military, aerospace industries and the like. The types of high temperature resistant polyamides that have been industrially produced mainly include PA46, PA6T, PA9T, etc. At the same time, novel high temperature resistant materials such as PA10T, PA4T, and PA12T also began to emerge.

At present, industrial production of semi-aromatic polyamides is conventionally conducted by a solution polycondensation process, which generally comprises two steps: firstly, polymerizing in an autoclave to obtain a semi-aromatic polyamide prepolymer, and then carrying out melt polycondensation, or solid state polymerization to increase the molecular weights, thereby obtaining a polyamide polymer. Therefore, such process is generally called a two-step process. For example, CN102372920A discloses a partially aromatic polyamide molding composition and its use. Firstly, the formulation components of the polyamide were placed into a 20 L autoclave together with a catalyst, a regulator and water. The reaction mixture was heated to a temperature of 260° C. over a period of 50 to 80 minutes and maintained at a pressure of 32 bar for one hour. Subsequently, the pre-condensate was discharged via a nozzle. The pre-condensate was dried under a reduced pressure and post-condensed in a double-screw extruder. Then the product was extruded from a nozzle and pelletized.

Existing processes use water as solvent, and thus are cost-efficiently and environmental-friendly. However, the produced prepolymers have relatively low molecular weights, making it difficult to directly use the same. A further melt polycondensation, or a solid phase polymerization is needed to increase the molecular weights, which also prolongs the production cycle and increases the cost.

SUMMARY OF THE INVENTION

One embodiment according to the present invention provides a process for producing a high temperature resistant polyamide, wherein the process comprises:
optionally concentrating a polyamide salt solution, and then conducting the following operations:
(1) heating and pressurizing to a pressure of P1, and maintaining the pressure, wherein the temperature of the system is T1 at the end of the pressure-maintenance;
(2) depressurizing to a pressure of P2, wherein the temperature of the system is T2 at the end of the depressurization; and
(3) evacuating, whereby a polyamide melt is obtained;
wherein P1 is 0.8-4 MPa, T1 is 250-290° C., T1<T2 and (T2−T1)/(P1−P2)=5-75.

One embodiment according to the present invention provides a high temperature resistant polyamide, wherein the high temperature resistant polyamide comprises at least a polyamide produced from Component (A) diamine and Component (B) diacid as raw materials, and the molar ratio of Component (A) to Component (B) is (0.5-5):1.

Component (A) diamine comprises:
any one of (a1) aliphatic linear, or branched diamines having 4 to 16 carbon atoms; (a2) aromatic diamines, or cycloaliphatic diamines; or any combination of two or more thereof; and/or Component (B) diacid comprises:
any one of (b1) aliphatic diacids having 2 to 18 carbon atoms; (b2) a benzene ring-containing diacid having 8 carbon atoms, or more; or any combination of two or more thereof.

One embodiment according to the present invention provides a high temperature resistant polyamide, characterized in that the high temperature resistant polyamide comprises at least a polyamide produced from a solution of Component (C) polyamide salt as a raw material.

One embodiment according to the present invention provides a high temperature resistant polyamide, wherein a structural unit of the high temperature resistant polyamide includes the following formula:

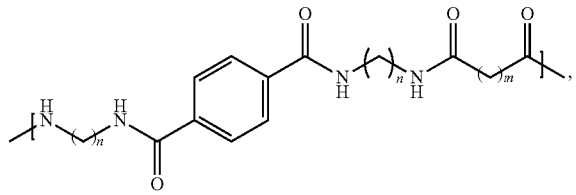

wherein n=4-16, and m=2-18.
In one embodiment, n is preferably 4-7.
In one embodiment, m is preferably 4-16.
The high temperature resistant polyamide has a melting point of 280-328° C., and preferably 286-328° C.
The high temperature resistant polyamide has a relative viscosity of 1.80-2.70.
The high temperature resistant polyamide has a notched impact strength of 5-12 KJ/cm$^2$, and preferably 6.5-10 KJ/cm$^2$.
The high temperature resistant polyamide has a tensile strength of 95-140 MPa, preferably 105-134 MPa.
The high temperature resistant polyamide has a flexural strength of 135-190 MPa, and preferably 155-183 MPa.
The high temperature resistant polyamide has a flexural modulus of 3,500-4,400 MPa.
The high temperature resistant polyamide has a heat deflection temperature of 240-320° C., and preferably 260-300° C.

One embodiment according to the present invention provides a use of the high temperature resistant polyamide, wherein the high temperature resistant polyamide is a raw material for injection molded parts, molded articles, or fibers.

The process for producing high temperature resistant polyamide has the advantages that the process is simple and reduces energy consumption compared to existing polymerization processes. The correlation between pressure and temperature is utilized to solve the problem of high sample residue in the autoclave and overcome the difficulty in continuous multi-batch production. The process is suitable for the production of a high temperature resistant polyamide with good product quality.

DETAILED DESCRIPTION OF THE DISCLOSURE

Typical embodiments embodying the features and advantages of the present invention will be described in detail in the following description. It should be understood that the present invention can have various variants in different embodiments without departing from the scope of the present invention. The description recited therein is substantively used for the purposes of illustration and should not be used to limit the present invention.

One embodiment according to the present invention provides a process for producing a high temperature resistant polyamide, wherein the process comprises:
optionally concentrating a polyamide salt solution, and then conducting the following operations:
(1) heating and pressurizing to a pressure of P1, and maintaining the pressure, wherein the temperature of the system is T1 at the end of the pressure-maintenance;
(2) depressurizing to a pressure of P2, wherein the temperature of the system is T2 at the end of the depressurization; and
(3) evacuating, whereby a polyamide melt is obtained.

Preferably, the process comprises the following steps:
optionally concentrating a polyamide salt solution having a mass concentration of 20 to 90 wt %, and then conducting the following operations:
(1) heating and pressurizing to a pressure of P1, and maintaining the pressure, wherein the temperature of the system is T1 at the end of the pressure-maintenance;
(2) depressurizing to a pressure of P2, wherein the temperature of the system is T2 at the end of the depressurization; and
(3) evacuating, whereby a polyamide melt is obtained.

In one embodiment, the process comprises the following steps:
mixing Component (A) diamine, Component (B) diacid and water to produce a polyamide salt solution having a mass concentration of 20 to 90 wt %; optionally concentrating the polyamide salt solution, and then conducting the following operations:
(1) heating and pressurizing to a pressure of P1, and maintaining the pressure, wherein the temperature of the system is T1 at the end of the pressure-maintenance;
(2) depressurizing to a pressure of P2, wherein the temperature of the system is T2 at the end of the depressurization; and
(3) evacuating, whereby a polyamide melt is obtained.

In one embodiment, when the polyamide salt solution has a mass concentration of 10 wt %, the pH value is 6.5 to 9.0, and preferably 7.6 to 8.4, such as 7.2, 7.4, 7.6, 7.8, 8.0, 8.1, 8.2, 8.3, 8.5, or 8.7. Herein, the concentration in "the polyamide salt solution has a mass concentration of 10 wt %" can refer to the mass concentration of the unconcentrated polyamide salt solution as such, or the mass concentration obtained after sampling and diluting the concentrated, or unconcentrated polyamide salt solution. In one embodiment, the polyamide salt solution has a mass concentration of 20 wt %, or more, and preferably 20-90 wt %, such as 25 wt %, 30 wt %, 35 wt %, 40 wt %, 45 wt %, 48 wt %, 55 wt %, 57 wt %, 60 wt %, 62 wt %, 65 wt %, 68 wt %, 70 wt %, 72 wt %, 75 wt %, 77 wt %, 80 wt %, or 85 wt %. Herein, the mass concentration of a polyamide salt solution can be the mass concentration of the unconcentrated polyamide salt solution as such, or the mass concentration of the concentrated polyamide salt solution.

In one embodiment, the polyamide salt comprises a salt produced by the reaction of Component (A) diamine and Component (B) diacid. The molar ratio of Component (A) to Component (B) is (0.5-5):1, preferably (0.6-3):1, more preferably (0.6-1.6):1, further more preferably (0.9-1.3):1, and still more preferably (1.01-1.3):1. The pH value of the polyamide salt solution may be adjusted by controlling the molar ratio of the diamine to the diacid. For example, by making the diamine stoichiometrically excessive relative to the diacid, the pH of the polyamide salt is made alkaline.

The polyamide salt solution comprises at least ions of Component (A) diamine and ions of Component (B) diacid.

In one embodiment, the polyamide salt solution comprises:
any one of (1) a solution obtained by mixing Component (A) diamine, Component (B) diacid and a solvent; (2) a solution obtained by mixing Component (C) polyamide salt and a solvent; and (3) a solution obtained by mixing Component (C) polyamide salt, Component (A) diamine and/or Component (B) diacid and a solvent; or any combination of two or more thereof.

The solvent comprises, but is not limited to, water.

The salt produced by the reaction of diamine and diacid is polyamide salt, which is also called "nylon salt". Polyamide is obtained through polycondensation of a polyamide salt. During the polycondensation in Step (1) to Step (3), a carboxyl group and an amino group between the polyamide salts are bonded and water is eliminated.

In one embodiment, the diamine, or the diacid may be produced by a fermentation process, or an enzymatic conversion process.

In one embodiment, P1 is 0.8-4 MPa, and T1 is 250-290° C.

In one embodiment, P1 is 3-4 MPa.

In one embodiment, T1 is 275-290° C.

In some embodiments, P1 is, for example, 1 MPa, 1.2 MPa, 1.5 MPa, 1.8 MPa, 2 MPa, 2.1 MPa, 2.2 MPa, 2.5 MPa, 3 MPa, 3.5 MPa, or 3.8 MPa.

In some embodiments, T1 is, for example, 255° C., 260° C., 262° C., 265° C., 268° C., 270° C., 272° C., 275° C., 277° C., 280° C., 283° C., or 286° C.

In one embodiment, T1<T2, and (T2−T1)/(P1−P2)=5-75.
In one embodiment, T1<T2, and (T2−T1)/(P1−P2)=5-55.
In one embodiment, T1<T2, and (T2−T1)/(P1−P2)=10-45.
In one embodiment, T1<T2, and (T2−T1)/(P1−P2)=10-23.
In one embodiment, T1<T2, and (T2−T1)/(P1−P2)=10-16.

In one embodiment, (T2−T1)/(P1−P2) may be, for example, 10, 12, 14, 15, 18, 20, 22, 25, 28, 30, 35, 40, 42, 46, 50, 55, 57, 63, 66, or 68.

(T2−T1) is the difference value between T2 (° C.) and T1 (° C.); (P1−P2) is the difference value between P1 (MPa) and P2 (MPa).

In one embodiment, Component (A) diamine comprises:
any one of (a1) aliphatic linear, or branched diamines having 4 to 16 carbon atoms; (a2) aromatic diamines, or cycloaliphatic diamines; or any combination of two or more thereof.

In one embodiment, Component (B) diacid comprises: any one of (b1) aliphatic diacids having 2 to 18 carbon atoms; (b2) a benzene ring-containing diacid having 8, or more carbon atoms; or any combination of two or more thereof.

In some embodiments, Component (a1) is aliphatic linear, or branched diamines having 4, 5, 6, 7, 8, 9, 10, 11, 12, 13, 14, 15, or 16 carbon atoms.

In some embodiments, the number of carbon atoms in Component (a2) is 5-10, preferably 5-6, such as 5, 6, 7, 8, 9, or 10.

In some embodiments, the number of carbon atoms in Component (b1) may be 2, 3, 4, 5, 6, 7, 8, 9, 10, 11, 12, 13, 14, 15, 16, 17, or 18.

In one embodiment, the number of carbon atoms in Component (b2) may be 8-12, and preferably 8-10.

In some embodiments, the number of carbon atoms in Component (b2) may be, for example, 8, 9, 10, 11, or 12.

In one embodiment, Component (a1) comprises one, or more of butane diamine, pentane diamine, hexane diamine, heptane diamine, octane diamine, nonane diamine, decane diamine, undecane diamine, dodecane diamine, tridecane diamine, tetradecane diamine, pentadecane diamine, and hexadecane diamine.

In one embodiment, Component (a2) comprises one, or more of cyclopentane diamine, methyl cyclopentane diamine, cyclohexane diamine, p-phenylenediamine, o-phenylenediamine, and m-phenylenediamine.

In one embodiment, Component (b1) comprises one, or more of oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, and octadecanedioic acid.

In one embodiment, Component (b2) comprises one, or more of terephthalic acid, isophthalic acid, and phthalic acid.

In one embodiment, the polyamide salt solution is a solution obtained by mixing at least Component (A) diamine, Component (B) diacid and a solvent.

In one embodiment, Component (A) diamine comprises: (a1) aliphatic linear, or branched diamines having 4 to 16 carbon atoms; and Component (B) diacid comprises: (b1) aliphatic diacids having 2 to 18 carbon atoms, and (b2) one, or more of terephthalic acid, isophthalic acid, and phthalic acid.

In one embodiment, the molar ratio of Component (A) to Component (B) is (0.5-5):1, preferably (0.6-3):1, more preferably (0.6-1.6):1, further preferably (0.9-1.3):1, and still more preferably (1.01-1.3):1, such as 1:1, 1.1:1, 1.15:1, 1.2:1, 1.3:1, 1.5:1, 1.8:1, 2:1, 2.3:1, 2.5:1, 3:1, 3.5:1, or 4:1.

In one embodiment, the molar ratio of Component (a1) to Component (b1) is (0.5-12):1, preferably (1-10):1, more preferably (1-8):1, further preferably (2-5):1, and still more preferably (2.3-3.3):1, such as 0.8:1, 1.2:1, 1.4:1, 1.5:1, 1.8:1, 2:1, 2.2:1, 2.5:1, 2.7:1, 3:1, 3.2:1, 3.5:1, 4.5:1, 5:1, 6:1, 8:1, or 9:1.

In one embodiment, the molar ratio of Component (a1) to Component (b2) is (0.1-6):1, preferably (0.5-5):1, more preferably (0.5-4):1, further preferably (1-4):1, more preferably (1-2):1, further preferably (1-1.7):1, and still more preferably (1.4-1.7):1, such as 0.2:1, 0.3:1, 0.7:1, 1.0:1, 1.3:1, 1.5:1, 1.6:1, 1.8:1, 2:1, 2.3:1, 2.5:1, 2.6:1, 2.8:1, 3:1, 3.5:1, 3.8:1, 4:1, or 4.6:1.

In one embodiment, the parameters such as the tensile strength, flexural strength, and/or flexural modulus of the polyamide product may be improved by controlling the relationship between the components diamines and diacids, especially the types, contents, and/or relative ratio.

In one embodiment, the content of Component (b2) is within the reasonable ranges as described above, and the parameters such as the tensile strength, flexural strength, flexural modulus of the polyamide product are improved.

In one embodiment, the flexibility of the polyamide product is improved by introducing long-chain diacids/diamines.

In one embodiment, in Step (1), the pressure maintenance time is 1 to 4 hours, and preferably 1.5 to 3 hours.

In one embodiment, in Step (1), the manner of pressure maintenance is degassing to maintain pressure.

In one embodiment, during Step (2) of depressurizing to a pressure of P2, the pressure P and the temperature T satisfy the following conditions: when P is 0.4-0.65 times of P1, for example, when P is 0.4-0.6 times of P1, or when P is 0.4-0.55 times of P1, $T=(1.01-1.18) \times T1$; such as $1.095T1$, $1.097T1$, $1.101T1$, $1.102T1$, $1.11T1$, $1.115T1$, $1.12T1$, $1.13T1$, $1.14T1$, $1.145T1$, $1.15T1$, $1.16T1$, or $1.17T1$, wherein $P2<P<P1$, and $T1<T<T2$.

In one embodiment, during Step (2) of depressurizing to a pressure of P2, the pressure P and the temperature T satisfy the following conditions: when P is 0.4-0.65 times of P1, for example, when P is 0.4-0.6 times of P1, or when P is 0.4-0.55 times of P1, T is $(1.03-1.18) \times T1$, further preferably $(1.04-1.18) \times T1$, more preferably $(1.04-1.16) \times T1$, further preferably $(1.04-1.15) \times T1$, more preferably $(1.06-1.15) \times T1$, further more preferably $(1.095-1.14) \times T1$, and still more preferably $(1.095-1.13) \times T1$, wherein $P2<P<P1$, and $T1<T<T2$.

In one embodiment, during Step (2) of depressurizing to a pressure of P2, the pressure P and the temperature T satisfy the following conditions: when P is 0.1-0.3 times of P1, for example, when P is 0.12-0.3 times of P1, or when P is 0.14-0.3 times of P1, T is $(1.132-1.26) \times T1$, such as $1.15T1$, $1.17T1$, $1.22T1$, $1.23T1$, $1.24T1$, $1.25T1$, or $1.27T1$, wherein $P2<P<P1$, and $T1<T<T2$.

In one embodiment, during Step (2) of depressurizing to a pressure of P2, the pressure P and the temperature T satisfy the following conditions: when P is 0.1-0.3 times of P1, for example, when P is 0.12-0.3 times of P1, or P is 0.14-0.3 times of P1, T is $(1.132-1.20) \times T1$, further preferably $(1.132-1.17) \times T1$, more preferably $(1.132-1.16) \times T1$, and preferably $(1.132-1.155)) \times T1$, wherein $P2<P<P1$, and $T1<T<T2$.

In one embodiment, the yield of the process is improved by controlling the course Step (2) of depressurizing.

In one embodiment, the relative viscosity of the obtained polyamide product is relatively higher by controlling the course of Step (2) of depressurizing.

In one embodiment, during the depressurization in Step (2), the temperature of the system is kept increasing.

In one embodiment, the time period for the depressurization in Step (2) is 0.5 to 3 hours, and preferably 0.8 to 1.5 hours.

In one embodiment, T2 is 295-340° C., preferably 305-335° C., and more preferably 325-335° C. For example, T2 is 300° C., 310° C., 315° C., 320° C., or 330° C.

In one embodiment, P2 is 0-0.05 MPa, and preferably 0-0.02 MPa. For example, P2 is 0.01 MPa, 0.02 MPa, 0.03 MPa, 0.035 MPa, or 0.04 MPa.

In one embodiment, $P1>P2$.

In one embodiment, during the polycondensation, in addition to the water originally contained in the polyamide salt solution, the water existing in the system also comprises water produced during the polycondensation.

In one embodiment, steam is discharged during the polycondensation, which adjusts the reaction process, in particular reduces the pressure of the system.

In one embodiment, steam is discharged during Step (1) and Step (2) so as to reduce the pressure of the system.

In one embodiment, steam is discharged to the outside during Step (1), and the ratio of the discharged steam (mol) to the water content (mol) in the polyamide salt solution (abbreviated as dewatering ratio) is (60.6-93.9):100, preferably (75.4-90.9):100, more preferably (80-90.9):100, and still more preferably (87-90.9):100, such as 65:100, 70:100, 72:100, 75:100, 78:100, 82:100, 84:100, 85:100, 86:100, 88:100, 90:100, or 91:100.

In one embodiment, steam is discharged to the outside during Step (1), and the ratio of the discharged steam (mol) to the water content (mol) in the polyamide salt solution (abbreviated as dewatering ratio) is (60.6-93.9):100, preferably (75.4-93.9):100, more preferably (80-93.9):100, and still more preferably (87-93.9):100.

In one embodiment, steam is discharged during Step (2), and the ratio of the discharged steam (mol) to the water content (mol) in the polyamide salt solution (abbreviated as dewatering ratio) is (93.9-118.2):100, preferably (93.9-114):100, preferably (98.7-113.9):100, such as 94:100, 95:100, 96:100, 97:100, 98:100, 99:100, 100:100, 102:100, 103:100, 105:100, 107:100, 110:100, or 112:100.

In one embodiment, steam is discharged during Step (2), and the ratio of the discharged steam (mol) to the water content (mol) in the polyamide salt solution (abbreviated as dewatering ratio) is (93.9-118.2):100, further preferably (104-117):100, more preferably (110-117):100, and still more preferably (110-114):100.

In one embodiment, prior to the reaction in Step (1), the polyamide salt solution is concentrated, and the dewatering ratio in Step (1) and Step (2) is based on the concentrated polyamide salt solution.

In one embodiment, prior to the reaction in Step (1), the polyamide salt solution is concentrated to a concentration of 50% to 85 wt %, more preferably 55 to 70 wt %, and still more preferably 60 to 70 wt %, such as 52 wt %, 55 wt %, 57 wt %, 60 wt %, 62 wt %, 65 wt %, 68 wt %, 70 wt %, 72 wt %, 75 wt %, 77 wt %, 80 wt % and 85 wt %.

In one embodiment, in Step (3), evacuation is conducted to a pressure of −0.09 to −0.005 MPa, further preferably −0.09 to −0.01 MPa, more preferably −0.09 to −0.02 MPa, and still more preferably −0.065 to −0.04 MPa.

In one embodiment, at the end of Step (3) of the evacuation, the temperature of the system is 310-340° C., preferably 315-335° C., such as 312° C., 318° C., 320° C., 325° C., 328° C., 330° C., or 333° C.

In one embodiment, the evacuation time in Step (3) is 1-40 min, and preferably 4-20 min.

In one embodiment, the process further comprises Step (4): discharging and pelletizing the polyamide melt, whereby a polyamide resin is obtained.

In one embodiment, the pelletization may be a water-cooling pelletization, and the temperature of the cooling water is 10-30° C.

In one embodiment, the polyamide salt solution further comprises Component (D) additive(s).

In one embodiment, Component (D) additive(s) are added at any stage of Step (1) to Step (3).

In one embodiment, Component (D) comprises one, or more of antioxidants, defoamers, UV stabilizers, heat stabilizers, crystallization accelerators, free radical scavengers, lubricants, plasticizers, impact modifiers, inorganic fillers, brighteners, dyes, flame retardants, and minerals.

In one embodiment, the molar quantity of Component (D) is (0.001-1)%, preferably (0.01-0.8)%, preferably (0.02-0.4)%, such as 0.03%, 0.05%, 0.07%, 0.1%, 0.12%, 0.15%, 0.2%, 0.24%, 0.27%, 0.30%, 0.33%, 0.38%, 0.45%, 0.5%, or 0.6% of the molar quantity of Component (A) and/or Component (C).

In one embodiment, the heat stabilizer further comprises one, or more of phosphoric acid, phosphorous acid, trimethyl phosphite, triphenyl phosphite, trimethyl phosphate, triphenyl phosphate, sodium hypophosphite, zinc hypophosphite, and potassium hypophosphite.

In one embodiment, the crystallization accelerator further comprises a metal salt of a long carbon chain carboxylic acid. The number of carbon atoms of the long carbon chain carboxylic acid is preferably 10-30, and the metal preferably includes one, or more of calcium, magnesium, and zinc.

In one embodiment, the inorganic filler further comprises one, or more of glass fibers, glass beads, carbon fibers, carbon black, and graphite.

In one embodiment, the mineral further comprises one ore more of titanium dioxide, calcium carbonate, and barium sulfate.

In one embodiment, Component (D) additive(s) comprises at least an antioxidant.

In one embodiment, Component (D) additive(s) comprises at least a defoamer.

In one embodiment, Component (D) additive(s) comprises at least a heat stabilizer.

In one embodiment, Component (D) additive(s) comprises at least an antioxidant, a defoamer, and a heat stabilizer.

In one embodiment, the entire process for producing the high temperature resistant polyamide is performed under an inert gas atmosphere.

In one embodiment, Step (1) and/or Step (2) and/or Step (3) and/or Step (4) are performed under an inert gas atmosphere.

The inert gas comprises nitrogen, argon, or helium.

One embodiment of the present invention provides a high temperature resistant polyamide, comprising a polyamide produced from Component (A) diamine and Component (B) diacid as raw materials, and the molar ratio of Component (A) to Component (B) is (0.5-5):1.

In one embodiment, Component (A) diamine comprises:
any one of (a1) aliphatic linear, or branched diamines having 4 to 16 carbon atoms; (a2) aromatic diamines, or cycloaliphatic diamines; or any combination of two or more thereof.

In one embodiment, Component (B) diacid comprises:
any one of (b1) aliphatic diacids having 2 to 18 carbon atoms; (b2) a benzene ring-containing diacid having 8, or more carbon atoms; or any combination of two or more thereof.

In one embodiment, the high temperature resistant polyamide comprises at least a polyamide produced from a solution of Component (C) polyamide salt as a raw material.

In one embodiment, the structural unit of the high temperature resistant polyamide includes the following formula:

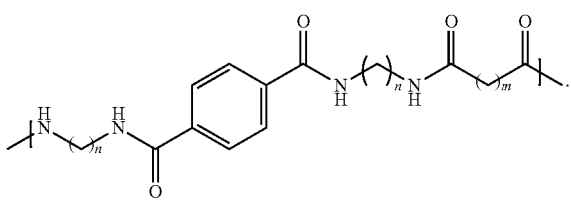

Wherein, n=4-16, preferably 4-10, and preferably 4-8, for example, n is 4, 5, 6, 7, 8, 9, 10, 11, 12, 13, 14, 15, or 16;

m=2-18, and preferably 4-16, for example, m is 2, 3, 4, 5, 6, 7, 8, 9, 10, 11, 12, 13, 14, 15, or 16.

In one embodiment, a high temperature resistant polyamide is provided. The high temperature resistant polyamide has a melting point of 280-328° C., preferably 286-328° C., and preferably 293-320° C., such as 290, 294, 298, 301, 304, 307, 309, 312, 315, 317, 321, or 325° C.

The high temperature resistant polyamide has a relative viscosity of 1.80-2.70, and preferably 2.0-2.5, such as 1.85, 1.9, 1.95, 2.1, 2.2, 2.3, 2.4, 2.55, 2.6, 2.67, or 2.7.

The high temperature resistant polyamide has a notched impact strength of 5-12 KJ/cm$^2$, preferably 7.0-10 KJ/cm$^2$, and more preferably 6.5-10 KJ/cm$^2$, such as 5.5, 6.5, 7.5, 8.0, 8.2, 8.5, 8.7, 9.3, 9.6, 9.8, 10.2, or 10.5 KJ/cm$^2$.

The high temperature resistant polyamide has a tensile strength of 95-140 MPa, preferably 105-134 MPa, and more preferably 105-131 MPa, such as 100, 110, 112, 116, 119, 121, 125, 132, 135, or 138 MPa.

The high temperature resistant polyamide has a flexual strength of 135-190 MPa, preferably 155-183 MPa, and more preferably 155-173 MPa, such as 140, 145, 150, 154, 157, 161, 164, 169, 172, 175, 178, 183, or 185 MPa.

The high temperature resistant polyamide has a flexural modulus of 3500-4400 MPa, and preferably 3700-4200 MPa, such as 3600, 3650, 3750, 3800, 3850, 3890, 3920, 3950, 3995, 4050, 4130, 4200, or 4300 MPa.

The high temperature resistant polyamide has a heat deflection temperature of 240-320° C., preferably 270-310° C., and more preferably 260-300° C., such as 249, 250, 251, 252, 253, 254, 255, 256, 257, 258, 259, 260, 261, 262, 263, 264, 265, 266, 267, 268, 269, 270, 271, 272, 273, 274, 275, 276, or 277° C.

In one embodiment, a use of the high temperature resistant polyamide is provided, wherein the high temperature resistant polyamide is a raw material for injection molded parts, molded articles, or fibers.

In one embodiment, the high temperature resistant polyamide is used as a raw material for such injection molded parts, molded articles, or fibers as high temperature resistant attachments for machines, automobiles, household appliances, toys, textiles, sporting goods, mobile phones, computers, laptops, GPS devices, or optical devices.

The high temperature resistant polyamide and its preparation process according to one embodiment of the present invention will be further illustrated hereinafter in conjunction with specific Examples. Relevant tests as involved are as follows:

1) Flexural Strength and Flexural Modulus test: the test is conducted according to the standard ISO 178-2010 under a condition of 2 mm/min. The size of a sample bar is 10 mm*4 mm*80 mm.
2) Tensile Strength test: the test is conducted according to the standard ISO 572-2-2012 under a condition of 50 mm/min.
3) Notched Impact Strength test: the notched impact strength test is a cantilever beam notched impact test according to the measurement standard ISO 180/1A under the test condition of 23° C.
4) Relative Viscosity: the relative viscosity is tested by using concentrated sulfuric acid and an Ubbelohde viscometer in the following manner: precisely weighing 0.25±0.0002 g dried polyamide resin chips, and adding 50 mL concentrated sulfuric acid (96 wt %) to dissolve the polyamide resin chips, thereby obtaining a polyamide sample solution; and measuring and recording the flow time to of the concentrated sulfuric acid and the flow time of the polyamide sample solution in a water bath at a constant temperature of 25° C.

Relative viscosity is calculated according to the following equation:

$$\text{relative viscosity} = t/t_0;$$

t represents the flow time of the polyamide sample solution; and to represents the flow time of the solvent of concentrated sulfuric acid.

5) Heat Deflection Temperature (HDT): blending a polyamide produced in the Examples with 30 wt % of glass fibers to obtain a glass fiber reinforced polyamide. Then the heat deflection temperature is tested according to the national standard GB/T 1634.2-2004, wherein the sample is 120 mm*10 mm*4 mm in size (length*width*thickness), and the flexural stress applied is 1.8 MPa.
6) Melting Point test: the test is performed on a differential scanning calorimeter.

Unless otherwise specified, all the temperatures in the present invention are expressed in ° C., all the pressures are gauge pressures, and the pressures are expressed in MPa. Unless otherwise specified, the antioxidant H10 used in the Examples is BRUGGOLEN H10 antioxidant, and the defoamer used in the Examples is Dow Corning Defoamer 3168.

Example 1

The process for producing a high temperature resistant polyamide comprised the following steps:

3838.73 mol of 1,5-pentanediamine, 1411.03 mol of adipic acid, 2423.04 mol of terephthalic acid and water were mixed uniformly under a nitrogen atmosphere to produce a 50 wt % of polyamide salt solution. A sample was taken from the polyamide salt solution. When the sample was diluted to a concentration of 10 wt %, the pH value was 8.10. Sodium hypophosphite (120 ppm), antioxidant H10 (2000 ppm) and Dow Corning Defoamer 3168 (50 ppm) were added to the polyamide salt solution and mixed uniformly.

The polyamide salt solution was heated to 138° C. so as to be concentrated to a concentration of 65 wt %, and then subject to the following steps:

Step (1): The polyamide salt solution was continued to heat and pressurized. The pressure within the reaction system was increased to 3.5 MPa (P1), and the pressure is maintained by degassing. The temperature (T1) of the reaction system at the end of the pressure maintenance was 279° C.

Step (2): While keeping the temperature increasing, the pressure began to be reduced until the pressure within the reaction system dropped to 0 MPa (P2, gauge pressure). At this time, the reaction system had a temperature (T2) of 330° C. During the depressurization, when the pressure (P) was 1.8 MPa, the system had a temperature (T) of 303° C. When the pressure (P) was 0.7 MPa, the system had a temperature (T) of 319° C.

Step (3): The pressure was maintained at −0.06 MPa by evacuation. The evacuation time was 15 minutes. The temperature of the system was 335° C. at the end of the evacuation, and a polyamide melt was obtained.

Step (4): The melt was discharged, and pelletized by cooling with water to obtain a polyamide resin.

Wherein, the ratio of the discharged steam (mol) in Step (1) to the water content (mol) in the concentrated polyamide salt solution (65 wt %) (abbreviated as dewatering ratio) was 90.2:100. The ratio of the discharged steam (mol) in Step (2) to the water content (mol) in the concentrated polyamide salt solution (65 wt %) (abbreviated as dewatering ratio) was 113.1:100.

Example 2

The process for producing a high temperature resistant polyamide comprised the following steps:

3875 mol of 1,5-pentanediamine, 1894.80 mol of adipic acid, 1975.02 mol of terephthalic acid and water were mixed uniformly under a nitrogen atmosphere to produce a 50 wt % of polyamide salt solution. A sample was taken from the polyamide salt solution. When the sample was diluted to a concentration of 10 wt %, the pH value was 8.20. Sodium hypophosphite (120 ppm), antioxidant H10 (2000 ppm) and Dow Corning Defoamer 3168 (50 ppm) were added to the polyamide salt solution and mixed uniformly.

The polyamide salt solution was heated to 130° C. so as to be concentrated to a concentration of 68 wt %, and then subject to the following steps:

Step (1): The polyamide salt solution was continued to heat and pressurized. The pressure within the reaction system was increased to 2.5 MPa (P1), and the pressure was maintained by degassing. The temperature (T1) of the reaction system at the end of the pressure maintenance was 267° C.

Step (2): While keeping the temperature increasing, the pressure began to be reduced until the pressure within the reaction system dropped to 0 MPa (P2, gauge pressure). At this time, the reaction system had a temperature (T2) of 315° C. During the depressurization, when the pressure (P) was 1.2 MPa, the system had a temperature (T) of 295° C. When the pressure (P) was 0.4 MPa, the system had a temperature (T) of 308° C.

Step (3): The pressure was maintained at −0.04 MPa by evacuation. The evacuation time was 10 minutes. The temperature of the system was 321° C. at the end of the evaluation, and a polyamide melt was obtained.

Step (4): The melt was discharged, and pelletized by cooling with water to obtain a polyamide resin.

Wherein, the ratio of the discharged steam (mol) in Step (1) to the water content (mol) in the concentrated polyamide salt solution (68 wt %) (abbreviated as dewatering ratio) was 83.3:100. The ratio of the discharged steam (mol) in Step (2) to the water content (mol) in the concentrated polyamide salt solution (68 wt %) (abbreviated as dewatering ratio) was 106.9:100.

Example 3

The process for producing a high temperature resistant polyamide comprised the following steps:

3913.92 mol of 1,5-pentanediamine, 2418.56 mol of adipic acid, 1490.82 mol of terephthalic acid and water were mixed uniformly under a nitrogen atmosphere to produce a 50 wt % of polyamide salt solution. A sample was taken from the polyamide salt solution. When the sample was diluted to a concentration of 10 wt %, the pH value was 8.20. Sodium hypophosphite (120 ppm), antioxidant H10 (2000 ppm) and Dow Corning Defoamer 3168 (50 ppm) were added to the polyamide salt solution and mixed uniformly.

The polyamide salt solution was heated to 122° C. so as to be concentrated to a concentration of 62 wt %, and then subject to the following steps:

Step (1): The polyamide salt solution was continued to heat and pressurized. The pressure within the reaction system was increased to 1.4 MPa (P1), and the pressure was maintained by degassing. The temperature (T1) of the reaction system at the end of the pressure maintenance was 255° C.

Step (2): While keeping the temperature increasing, the pressure began to be reduced until the pressure within the reaction system dropped to 0 MPa (P2, gauge pressure). At this time, the reaction system had a temperature (T2) of 299° C. During the depressurization, when the pressure (P) was 0.7 MPa, the system had a temperature (T) of 287° C. When the pressure (P) was 0.2 MPa, the system had a temperature (T) of 298° C.

Step (3): The pressure was maintained at −0.02 MPa by evacuation. The evacuation time was 5 minutes. The temperature of the system was 313° C. at the end of the evaluation, and a polyamide melt was obtained.

Step (4): The melt was discharged, and pelletized by cooling with water to obtain a polyamide resin.

Wherein, the ratio of the discharged steam (mol) in Step (1) to the water content (mol) in the concentrated polyamide salt solution (62 wt %) (abbreviated as dewatering ratio) was 77.6:100. The ratio of the discharged steam (mol) in Step (2) to the water content (mol) in the concentrated polyamide salt solution (62 wt %) (abbreviated as dewatering ratio) was 99.8:100.

Example 4

The process for producing a high temperature resistant polyamide comprised the following steps:

2977.99 mol of decane diamine, 625 mol of adipic acid, 2351.05 mol of terephthalic acid and water were mixed uniformly under a nitrogen atmosphere to produce a 50 wt % of polyamide salt solution. A sample was taken from the polyamide salt solution. When the sample was diluted to a concentration of 10 wt %, the pH value was 8.20. Sodium hypophosphite (120 ppm), antioxidant H10 (2000 ppm) and Dow Corning Defoamer 3168 (50 ppm) were added to the polyamide salt solution and mixed uniformly.

The polyamide salt solution was heated to 130° C. so as to be concentrated to a concentration of 65 wt %, and then subject to the following steps:

Step (1): The polyamide salt solution was continued to heat and pressurized. The pressure within the reaction system was increased to 2.5 MPa (P1), and the pressure was maintained by degassing. The temperature (T1) of the reaction system at the end of the pressure maintenance was 270° C.

Step (2): While keeping the temperature increasing, the pressure began to be reduced until the pressure within the reaction system dropped to 0 MPa (P2, gauge pressure). At this time, the reaction system had a temperature (T2) of 320° C. During the depressurization, when the pressure (P) was 1.1 MPa, the system had a temperature (T) of 305° C. When the pressure (P) was 0.8 MPa, the system had a temperature (T) of 318° C.

Step (3): The pressure was maintained at −0.04 MPa by evacuation. The evacuation time was 10 minutes. The temperature of the system was 320° C. at the end of the evaluation, and a polyamide melt was obtained.

Step (4): The melt was discharged, and pelletized by cooling with water to obtain a polyamide resin.

Wherein, the ratio of the discharged steam (mol) in Step (1) to the water content (mol) in the concentrated polyamide salt solution (65 wt %) (abbreviated as dewatering ratio) was 83.1:100. The ratio of the discharged steam (mol) in Step (2) to the water content (mol) in the concentrated polyamide salt solution (65 wt %) (abbreviated as dewatering ratio) was 106.9:100.

Example 5

The process for producing a high temperature resistant polyamide comprised the following steps:

3587.55 mol of 1,5-pentanediamine, 602.39 mol of dodecanedioic acid, 2982.72 mol of terephthalic acid and water were mixed uniformly under a nitrogen atmosphere to produce a 50 wt % of polyamide salt solution. A sample was taken from the polyamide salt solution. When the sample was diluted to a concentration of 10 wt %, the pH value was 8.20. Sodium Hypophosphite (120 ppm), antioxidant H10 (2000 ppm), and Dow Corning Defoamer 3168 (50 ppm) were added to the polyamide salt solution and mixed uniformly.

The polyamide salt solution was heated to 130° C. so as to be concentrated to a concentration of 65 wt %, and then subject to the following steps:

Step (1): The polyamide salt solution was continued to heat and pressurized. The pressure within the reaction system was increased to 2.5 MPa (P1), and the pressure was maintained by degassing. The temperature (T1) of the reaction system at the end of the pressure maintenance was 275° C.

Step (2): While keeping the temperature increasing, the pressure began to be reduced until the pressure within the reaction system dropped to 0 MPa (P2, gauge pressure). At this time, the reaction system had a temperature (T2) of 315° C. During the depressurization, when the pressure (P) was 1.3 MPa, the system had a temperature (T) of 300° C. When the pressure (P) was 0.7 MPa, the system had a temperature (T) of 314° C.

Step (3): The pressure was maintained at −0.04 MPa by evacuation. The evacuation time was 10 minutes. The temperature of the system was 318° C. at the end of the evaluation, and a polyamide melt was obtained.

Step (4): The melt was discharged, and pelletized by cooling with water to obtain a polyamide resin.

Wherein, the ratio of the discharged steam (mol) in Step (1) to the water content (mol) in the concentrated polyamide salt solution (65 wt %) (abbreviated as dewatering ratio) was 81.0:100. The ratio of the discharged steam (mol) in Step (2) to the water content (mol) in the concentrated polyamide salt solution (65 wt %) (abbreviated as dewatering ratio) was 110.5:100.

Example 6

The steps and conditions for preparing the high temperature resistant polyamide are the same as those in Example 1, except that in Step (2), while keeping the temperature increasing, the pressure began to be reduced until the pressure within the reaction system dropped to 0 MPa (P2, gauge pressure); at this time, the reaction system had a temperature (T2) of 330° C.; during the depressurization, when the pressure (P) was 1.5 MPa, the system had a temperature (T) of 283° C., and when the pressure (P) was 0.7 MPa, the system had a temperature (T) of 319° C.

Example 7

The steps and conditions for preparing the high temperature resistant polyamide are the same as those in Example 1, except that in Step (2), while keeping the temperature increasing, the pressure began to be reduced until the pressure within the reaction system dropped to 0 MPa (P2, gauge pressure); at this time, the reaction system had a temperature (T2) of 330° C.; during the depressurization, when the pressure (P) was 1.8 MPa, the system had a temperature (T) of 303° C.; and when the pressure (P) was 0.6 MPa, the system had a temperature (T) of 330° C.

Example 8

The steps and conditions for preparing the high temperature resistant polyamide are the same as those in Example 1, except that in Step (2), while keeping the temperature increasing, the pressure began to be reduced until the pressure within the reaction system dropped to 0 MPa (P2, gauge pressure); at this time, the reaction system had a temperature (T2) of 330° C.; during the depressurization, when the pressure (P) was 1.5 MPa, the system had a temperature (T) of 283° C.; and when the pressure (P) was 0.6 MPa, the system had a temperature (T) of 330° C.

Example 9

The steps and conditions for preparing the high temperature resistant polyamide are the same as those in Example 1, except that the ratio of the discharged steam (mol) in Step (1) to the water content (mol) in the concentrated polyamide salt solution (65 wt %) (abbreviated as dewatering ratio) was 69.5:100; and the ratio of the discharged steam (mol) in Step (2) to the water content (mol) in the concentrated polyamide salt solution (65 wt %) (abbreviated as dewatering ratio) was 113.1:100.

Example 10

The steps and conditions for preparing the high temperature resistant polyamide are the same as those in Example 1, except that the ratio of the discharged steam (mol) in Step (1) to the water content (mol) in the concentrated polyamide salt solution (65 wt %) (abbreviated as dewatering ratio) was 70.2:100; and the ratio of the discharged steam (mol) in Step (2) to the water content (mol) in the concentrated polyamide salt solution (65 wt %) (abbreviated as dewatering ratio) was 116.7:100.

Example 11

The steps and conditions for preparing the high temperature resistant polyamide are the same as those in Example 4, except that in Step (2), while keeping the temperature increasing, the pressure began to be reduced until the pressure within the reaction system dropped to 0 MPa (P2, gauge pressure); at this time, the reaction system had a temperature (T2) of 330° C.; during the depressurization, when the pressure (P) was 1.5 MPa, the system had a temperature (T) of 275° C.; and when the pressure (P) was 0.7 MPa, the system had a temperature (T) of 319° C.

the ratio of the discharged steam (mol) in Step (1) to the water content (mol) in the concentrated polyamide salt solution (65 wt %) (abbreviated as dewatering ratio) was 71.4:100; and the ratio of the discharged steam (mol) in Step (2) to the water content (mol) in the concentrated polyamide salt solution (65 wt %) (abbreviated as dewatering ratio) was 113.1:100.

The test results for the polyamide resins obtained in the aforementioned Examples were shown in Table 1.

TABLE 1

|  | Yield (%) | Melting Point (° C.) | Relative Viscosity | Tensile Strength (MPa) | Flexural Strength (MPa) | Flexural Modulus (MPa) | Notched Impact Strength (KJ/m$^2$) | HDT (° C.) |
| --- | --- | --- | --- | --- | --- | --- | --- | --- |
| Example 1 | 98 | 318 | 2.43 | 130 | 173 | 3996 | 9.1 | 277 |
| Example 2 | 98 | 296 | 2.42 | 128 | 171 | 3960 | 9.2 | 265 |
| Example 3 | 98 | 281 | 2.42 | 124 | 168 | 3911 | 9.4 | 249 |
| Example 4 | 97 | 305 | 2.42 | 123 | 166 | 3915 | 9.8 | 268 |
| Example 5 | 98 | 300 | 2.41 | 120 | 162 | 3886 | 9.6 | 266 |
| Example 6 | 96 | 318 | 2.38 | 129 | 172 | 3993 | 9.1 | 277 |
| Example 7 | 95 | 318 | 2.37 | 129 | 172 | 3991 | 9.1 | 277 |
| Example 8 | 93 | 318 | 2.38 | 128 | 171 | 3990 | 9.1 | 277 |
| Example 9 | 95 | 318 | 2.39 | 129 | 172 | 3989 | 9.1 | 277 |
| Example 10 | 92 | 318 | 2.36 | 129 | 172 | 3982 | 9.0 | 277 |
| Example 11 | 92 | 305 | 2.27 | 122 | 165 | 3910 | 9.7 | 268 |

Unless specifically limited, the terms used in the present invention have the meanings commonly understood by those skilled in the art.

The embodiments described in the present invention are for illustrative purposes only, and are not intended to limit the protection scope of the present invention. Those skilled in the art can make various substitutions, modifications and improvements within the scope of the present invention. Therefore, the present invention is not limited to the above-mentioned embodiments but only defined by the claims.

What is claimed is:

1. A process for producing a high temperature resistant polyamide, wherein the process comprises the following steps:
   concentrating a polyamide salt solution, and then conducting the following operations:
   (1) heating and pressurizing to a pressure of P1, and maintaining the pressure, wherein the temperature of the system is T1 at the end of the pressure-maintenance;
   (2) depressurizing to a pressure of P2, wherein the temperature of the system is T2 at the end of the depressurization; and
   (3) evacuating, whereby a polyamide melt is obtained;
   wherein P1 is 0.8-4 MPa, T1 is 250-290° C., T1<T2 and (T2-T1)/(P1-P2)=5-75° C./MPa,
   in Step (1), steam is discharged to the outside, and the ratio of the discharged steam (mol) to the water content (mol) in the polyamide salt solution is (60.6-93.9):100.

2. The process for producing a high temperature resistant polyamide according to claim 1, wherein:
   the mass concentration of the polyamide salt solution is 20 wt %, or more; and/or
   prior to Step (1), the pH value is 6.5-9.0 when the concentration of the polyamide salt solution is 10 wt %.

3. The process for producing a high temperature resistant polyamide according to claim 1, wherein:

the polyamide salt comprises a salt produced by the reaction of Component (A) diamine and Component (B) diacid; and/or the polyamide salt solution comprises at least ions of Component (A) diamine and ions of Component (B) diacid; and/or the polyamide salt solution comprises:
   any one of (1) a solution obtained by mixing Component (A) diamine, Component (B) diacid and a solvent; (2) a solution obtained by mixing Component (C) polyamide salt and a solvent; and (3) a solution obtained by mixing Component (C) polyamide salt, Component (A) diamine and/or Component (B) diacid and a solvent; or any combination of two or more thereof.

4. The process for producing a high temperature resistant polyamide according to claim 3, wherein Component (A) diamine comprises:
   any one of (a1) aliphatic linear, or branched diamines having 4 to 16 carbon atoms; (a2) aromatic diamines, or cycloaliphatic diamines; or any combination of two or more thereof; and/or
   Component (B) diacid comprises:
   any one of (b1) aliphatic diacids having 2 to 18 carbon atoms; (b2) a benzene ring-containing diacid having 8, or more carbon atoms; or any combination of two or more thereof.

5. The process for producing a high temperature resistant polyamide according to claim 4, wherein:
   Component (a1) comprises one, or more of butane diamine, pentane diamine, hexane diamine, heptane diamine, octane diamine, nonane diamine, decane diamine, undecane diamine, dodecane diamine, tridecane diamine, tetradecane diamine, pentadecane diamine, and hexadecane diamine; and/or
   Component (a2) comprises one, or more of cyclopentane diamine, methyl cyclopentane diamine, cyclohexane diamine, p-phenylenediamine, o-phenylenediamine, and m-phenylenediamine; and/or
   Component (b1) comprises one, or more of oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, and octadecanedioic acid; and/or
   Component (b2) comprises one, or more of terephthalic acid, isophthalic acid, and phthalic acid.

6. The process for producing a high temperature resistant polyamide according to claim 4, wherein:

the molar ratio of Component (A) to Component (B) is (0.5-5):1; and/or the molar ratio of Component (a1) to Component (b1) is (0.5-12):1; and/or the molar ratio of Component (a1) to Component (b2) is (0.1-6):1.

7. The process for producing a high temperature resistant polyamide according to claim 3, wherein the polyamide salt solution further comprises Component (D) additive(s);

Component (D) comprises one, or more of antioxidants, defoamers, UV stabilizers, heat stabilizers, crystallization accelerators, free radical scavengers, lubricants, plasticizers, impact modifiers, inorganic fillers, brighteners, dyes, flame retardants, and minerals; and/or the molar quantity of Component (D) is 0.001% to 1% of the molar quantity of Component (A) and/or Component (C).

8. The process for producing a high temperature resistant polyamide according to claim 7, wherein the molar quantity of Component (D) is 0.01% to 0.8% of the molar quantity of Component (A) and/or Component (C).

9. The process for producing a high temperature resistant polyamide according to claim 1, wherein:

during Step (2) of depressurizing to a pressure of P2, the pressure P and the temperature T satisfy the following conditions: when P is 0.4-0.65 times of P1, T=(1.01-1.18)×T1; and/or during Step (2) of depressurizing to a pressure of P2, the pressure P and the temperature T satisfy the following conditions: when P is 0.1-0.3 times of P1, T=(1.132-1.26)×T1;

wherein P2<P<P1, and T1<T<T2.

10. The process for producing a high temperature resistant polyamide according to claim 1, wherein:

in Step (2), steam is discharged to the outside, and the ratio of the discharged steam (mol) to the water content (mol) in the polyamide salt solution is (93.9-118.2):100.

11. The process for producing a high temperature resistant polyamide according to claim 1, wherein:

prior to Step (1), the polyamide salt solution is concentrated to a concentration of 50-85 wt %; and/or adding Component (D) additive(s) in any stage of Step (1) to Step (3); and/or T2 is 295-340° C., and T1<T2; and/or P2 is 0-0.05 MPa, and P1>P2; and/or in Step (3), evacuating to a pressure of −0.09 to −0.005 MPa; and/or in Step (3), the temperature of the system is 310-340° C. at the end of the evacuation; and/or the process further comprises Step (4): discharging and pelletizing the polyamide melt, whereby a polyamide resin is obtained.

12. A high temperature resistant polyamide prepared by the process of claim 1, wherein the high temperature resistant polyamide comprises at least a polyamide produced from Component (A) diamine and Component (B) diacid as raw materials, the molar ratio of Component (A) to Component (B) is (0.5-5):1; and/or Component (A) diamine comprises:

any one of (a1) aliphatic linear, or branched diamines having 4 to 16 carbon atoms; (a2) aromatic diamines, or cycloaliphatic diamines; or any combination of two or more thereof; and/or Component (B) diacid comprises:

any one of (b1) aliphatic diacids having 2 to 18 carbon atoms; (b2) a benzene ring-containing diacid having 8 carbon atoms, or more; or any combination of two or more thereof, the high temperature resistant polyamide has a melting point of 280-328° C.; and the high temperature resistant polyamide has a relative viscosity of 1.80-2.70; and the high temperature resistant polyamide has a notched impact strength of 5-12 KJ/cm$^2$; and the high temperature resistant polyamide has a tensile strength of 95-140 MPa; and the high temperature resistant polyamide has a flexural strength of 135-190 MPa; and the high temperature resistant polyamide has a flexural modulus of 3,500-4,400 MPa; and the high temperature resistant polyamide has a heat deflection temperature of 240-320° C.

13. A high temperature resistant polyamide according to claim 12, wherein a structural unit of the high temperature resistant polyamide includes the following formula:

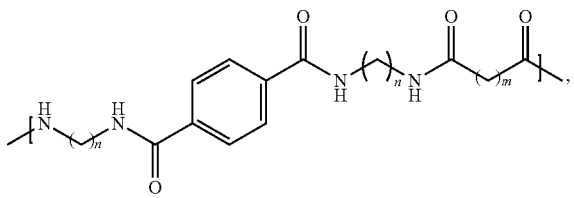

wherein n=4-16, and m=2-18.

14. The high temperature resistant polyamide according to claim 12, wherein:

the high temperature resistant polyamide has a melting point of 286-328° C.; or the high temperature resistant polyamide has a notched impact strength of 6.5-10 KJ/cm$^2$; or the high temperature resistant polyamide has a tensile strength of 105-134 MPa; or the high temperature resistant polyamide has a flexural strength of 155-183 MPa; or the high temperature resistant polyamide has a heat deflection temperature of 260-300° C.

15. The high temperature resistant polyamide according to claim 12, wherein the high temperature resistant polyamide is used as a raw material for injection molded parts, molded articles, or fibers.

16. The high temperature resistant polyamide according to claim 12, wherein the molar ratio of Component (A) to Component (B) is (1.01-1.3):1.

17. The high temperature resistant polyamide according to claim 12, wherein the high temperature resistant polyamide is used as a raw material in the production of one or more of: injection molded parts, molded articles, or fibers as high temperature resistant attachments for machines, automobiles, household appliances, toys, textiles, sporting goods, mobile phones, computers, laptops, GPS devices, and optical devices.

18. The process for producing a high temperature resistant polyamide according to claim 1, wherein:

the mass concentration of the polyamide salt solution is 20 to 90 wt %.

* * * * *